United States Patent
Ellegard

(10) Patent No.: US 8,363,670 B2
(45) Date of Patent: Jan. 29, 2013

(54) FRAMED FLOWS OVER PACKET-SWITCHED FABRICS

(75) Inventor: Lars Ellegard, Frederiksberg (DK)

(73) Assignee: Vitesse Semiconductor Corporation, Camarillo, CA (US)

( * ) Notice: Subject to any disclaimer, the term of this patent is extended or adjusted under 35 U.S.C. 154(b) by 212 days.

(21) Appl. No.: 12/763,972

(22) Filed: Apr. 20, 2010

(65) Prior Publication Data

US 2011/0255552 A1    Oct. 20, 2011

(51) Int. Cl.
*H04L 12/28* (2006.01)
(52) U.S. Cl. .................. 370/419; 370/474
(58) Field of Classification Search ............ None
See application file for complete search history.

(56) References Cited

U.S. PATENT DOCUMENTS

| | | | |
|---|---|---|---|
| 7,286,566 B1* | 10/2007 | Parruck et al. | 370/474 |
| 7,779,287 B2* | 8/2010 | Lim et al. | 713/500 |
| 7,889,989 B2* | 2/2011 | Zhang | 398/25 |
| 2010/0158518 A1* | 6/2010 | Shin et al. | 398/45 |
| 2010/0329112 A1* | 12/2010 | Ahn et al. | 370/225 |
| 2011/0255552 A1* | 10/2011 | Ellegard | 370/419 |
| 2011/0255865 A1* | 10/2011 | Brooks et al. | 398/27 |

* cited by examiner

*Primary Examiner* — Robert Wilson
(74) *Attorney, Agent, or Firm* — Klein, O'Neill & Singh, LLP

(57) ABSTRACT

A networking device and a method provide switching of framed signals using a packet switch fabric. Framed input signals, which may be OTN signals, are received and converted to packets. The conversion includes striping the received signal into virtual lanes and segmenting the lanes into packets. The packets are switched through the packet switch fabric, which may be an Ethernet switch, and then converted to framed output signals. The conversion includes reassembly of the packets into virtual lanes. The reassembled virtual lanes are frame aligned, deskewed, and combined to produce the framed output signals.

13 Claims, 3 Drawing Sheets

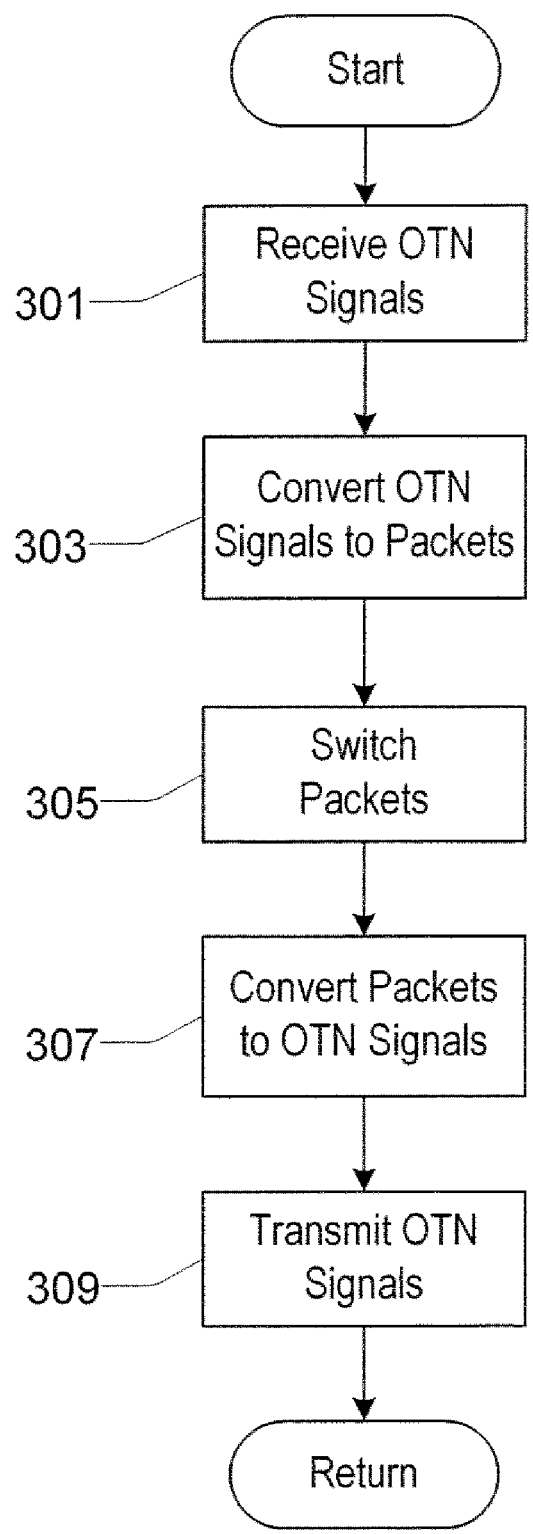

FRAMED FLOWS OVER PACKET-SWITCHED FABRICS

BACKGROUND OF THE INVENTION

The present invention relates generally to data communication, and more particularly to switching framed flows over packet-switched fabrics, for example, switching optical transport network (OTN) flows over Ethernet switch fabrics.

Communication of information in electronic form has increased rapidly over the past decades and continues to increase. As the volume of information communicated has increased, the rate at which the information is communicated has also increased. Additionally, previously independent producers and consumers of information are increasingly interconnected. Interconnections continue to increase between types of communication, for example, converged voice and data, and between geographic areas.

Information is often communicated using protocols that establish characteristics of the communication, such as how the information is arranged and how it is physically signaled. Many communication protocols are standardized by industry groups, international organizations, or other entities. Various standards are often targeted and work best for a specific type of information and type of physical communication medium and often particular network components may be designed to be particularly suited for communication or processing of information in accordance with a particular standard.

Unfortunately, individual standards and relative predominance of use of the standards may evolve over time, new standards may arise, and all may occur within a lifetime of an installed network component, or a desired lifetime of a previously designed network component. Moreover, the different standards may specify different information rates, increasing inconvenience relating to use of installed or previous designs for network components.

BRIEF SUMMARY OF THE INVENTION

In various aspects the invention provides a networking device for switching framed flows with packet-based switching, including a plurality of ingress converters, each of the plurality of ingress converters configured to receive a framed input signal and to convert the framed input signal into packets to be placed in a plurality of virtual lanes; a packet switching fabric coupled to the plurality of ingress converters to receive the packets in the plurality of virtual lanes on a plurality of input ports and configured to switch the packets to a plurality of output ports; and a plurality of egress converters, each of the plurality of egress converters coupled to the packet switching fabric to receive at least some of the packets from the output ports of the packet switching fabric and configured to supply a framed output signal converted from the received packets.

Another aspect of the invention provides a method of switching framed signals with a packet-based switch, the method including receiving a plurality of framed input signals; converting each of the plurality of framed input signals to packets logically grouped in virtual lanes; switching the packets converted from the plurality of framed input signals from input ports of a packet switch fabric to output ports of the packet switch fabric; converting the packets from the output ports of the packet switch fabric to framed output signals; and transmitting the framed output signals.

These and other aspects of the invention are more fully comprehended upon review of this disclosure.

BRIEF DESCRIPTION OF THE FIGURES

FIG. 3 is a flowchart of a process for switching optical transport network flows using a packet switch fabric in accordance with aspects of the invention.

DETAILED DESCRIPTION

Figure 1:
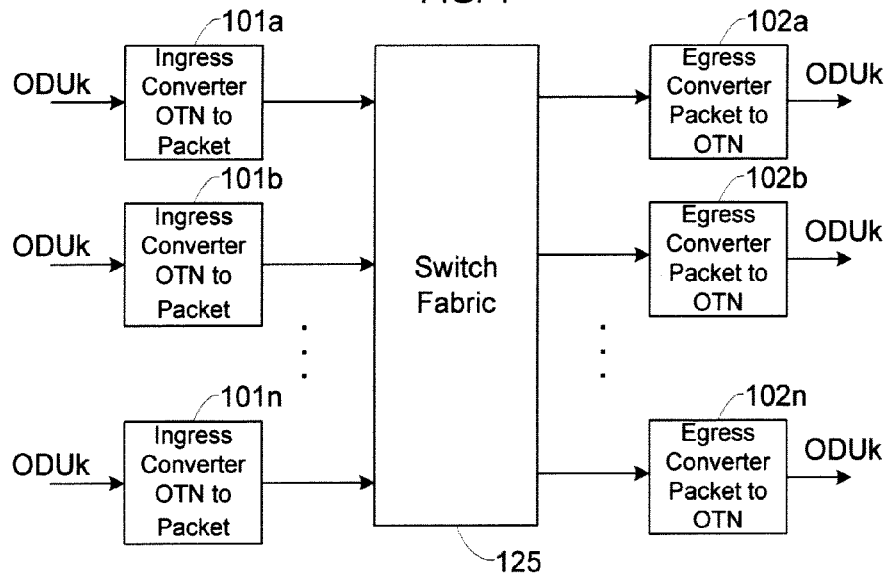
FIG. 1 is a block diagram of a networking device using a packet switch fabric for switching framed flows in accordance with aspects of the invention.

FIG. 1 is a block diagram of a networking device using a packet switch fabric for switching framed information flows in accordance with aspects of the invention. In some embodiments, as illustrated in FIG. 1, the framed information flows are optical transport network (OTN) flows. In other embodiments, the framed information flows are formatted according to other standards, for example, synchronous digital hierarchy (SDH) or synchronous optical networking (SONET). Framed information flows may be time-division multiplexed (TDM). The networking device receives a plurality of OTN input signals and produces a plurality of OTN output signals. The networking device uses packet-based switching to switch each of the OTN input signals to one of the OTN output signals.

The OTN input signals arrive at the networking device on a plurality of input ports. Each OTN input signal is converted to packets in one of a plurality of ingress converters 101a-n. The packets from the ingress converters are supplied to a switch fabric 125. The switch fabric supplies the packets it receives to a plurality of egress converters 102a-n. In each egress converter, the packets are converted to OTN signals.

The switch fabric supplies all the packets from one ingress converter to an egress converter that is paired with that ingress converter. Since the ingress converter produces its packets from one OTN input signal and the egress converter uses the packets it receives to produce one OTN output signal, each OTN input signal is reproduced in one of the OTN output signals. By selecting which ingress converter is paired with which egress converter in the switch fabric, the networking device effectively switches the OTN input signals to the OTN output signals.

In many embodiments, the switch fabric is, or is part of, an Ethernet switch. OTN signals generally have data rates that are somewhat higher than the data rate of a corresponding Ethernet signal or an integer multiple of an Ethernet signal. For example, an ODU2 signal has a data rate of approximately 10.04 Gb/s (10.6 Gb/s in some variations) which exceeds the capacity of a 10 gigabit Ethernet signal, an ODU3 signal has a data rate of approximately 40.3 Gb/s (41.8 Gb/s in some variations) which exceeds the capacity of a 40 gigabit Ethernet signal, and an ODU4 signal has a data rate of approximately 104.8 Gb/s which exceeds the capacity of a 100 gigabit Ethernet signal. Accordingly, the ingress converters may produce packets for transmission over multiple Ethernet signals, and the egress converters may combine packets from multiple Ethernet signals for transmission on one OTN signal.

Figure 2A:
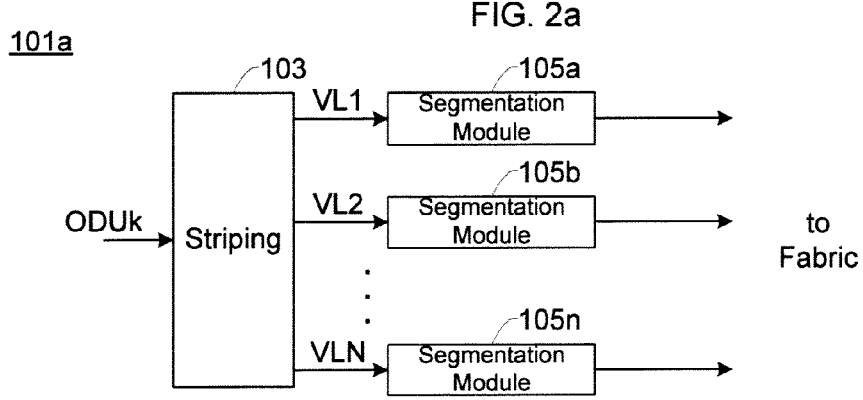
FIG. 2A is a block diagram of an ingress converter in accordance with aspects of the invention.

FIG. 2A is a block diagram of an ingress converter in accordance with aspects of the invention. In some embodiments, the ingress converter may be used as one of the ingress converters 101a-n of the networking device of FIG. 1. The ingress converter, in some embodiments, is built of electronic circuitry. For example, an ingress converter may be an integrated circuit or part of integrated circuit along with other circuitry including other ingress converters. In other embodiments, the ingress converter may be implemented using programmed instructions on a processor.

The ingress converter receives a framed input signal at a striping module 103. In some embodiments and as illustrated in FIG. 2A, the striping module receives an OTN input signal. The OTN input signal may be an ODUk signal, with k in some embodiments having values such as 0, 1, 2, 2e, 3, 4, or flex, or in some embodiments later defined values. The striping module stripes, or inverse multiplexes, the OTN input signal into N virtual lanes. The number of virtual lanes, N, is generally based on the rate of the OTN input signal and a desired rate of the output signals. For example, in an embodiment where the OTN input signal is an ODU3 signal, which has a rate of approximately 40.3 Gb/s, N may be 5 with each of the virtual lanes suitable for switching using 10 gigabit Ethernet.

The striping module uses framing information from the ODUk signal to determine which bytes to place in which virtual lane in some embodiments. Optical Data Channel Unit ("ODU") frames include a frame alignment signal (FAS) that signals the beginning of each frame. The ODU frames also include a multiframe alignment signal (MFAS) that increments, modulo 256, for each frame. The striping is performed by supplying M bytes, for example, 16 bytes, of the OTN input signal to the first virtual lane VL1, M bytes to the second virtual lane VL2, and so on through the N-th virtual lane VLN, and repeating beginning again with the first virtual lane. Each set of M bytes may be termed a word. The striping begins with the first bytes of the frame, which include the FAS. Which virtual lane includes the FAS rotates between the virtual lanes. The MFAS may be used to determine which virtual lane receives the FAS by using the value of the MFAS modulo N.

When N, the number of virtual lanes, is not an integral factor of 256, the MFAS range, a byte of the FAS, for example, the sixth byte, may be used for lane marking. Subsequent detection of frame alignment may use the other FAS bytes, or a subset of the other FAS bytes, and the full FAS may be restored before transmission from a networking device that uses a byte of the FAS from lane marking. The value of the lane marker byte may be set to incrementing values in successive frames. Rather than incrementing modulo 256 like the MFAS, the lane marker byte increments modulo the largest multiple of N that can be represented in one byte. For example, when there are the 22 virtual lanes, the lane marker byte increments modulo 242.

The striping module may include, in some embodiments, adding padding in order to match the size of the frames received to a specific number of virtual lanes and word size. The amount of padding is chosen to increase the size of the frame to an integral multiple of the product of the number of virtual lanes and the word size before forming the virtual lanes. Padded locations may be set to fixed values, for example, all zeros. Alternatively, the padded locations may be used to carry information. The padded frame size may be set to ceiling (F/(M×N))×M×N, where F is the input frame size, M is the word size, N is the number of virtual lanes, and the ceiling function returns the smallest integer not less than the operand.

The padding is often appended at the end of the input frame. The padding may also be prefixed to the input, inserted within the input frame, or otherwise distributed. In some embodiments, the padding may be performed at a subframe level. For example, when the input signal has ODU frames, each of which is made up of four rows, the striping module may add padding to each of the four rows separately. Additionally, the padding may be appended at the end of each row similar to the inclusion of forward error correction information in OTU frames.

The ingress adapter includes a plurality of segmentation modules 105a-n, one for each virtual lane. The segmentation module segments the data in the virtual lane into a sequence of packets. Each packet is formed by accumulating a number, for example, 1488, of bytes from the virtual lane and adding packet overhead, such as a header and checksum, to the payload data of the virtual lane. In some embodiments, the number of bytes from the virtual lane in one packet may vary, for example, some packets may have a greater or lesser number of bytes to match a frame boundary in the input signal to a packet boundary. The packet header may include source and destination addresses including possibly VLAN identifiers. In some embodiments, an initial byte or byte in the payload section of the packets may identify the virtual lane that the packet is associated with.

The packets from the segmentation modules are supplied to a switch fabric for switching to a defined destination. The packets from one virtual lane are supplied to a single input port of the switch fabric. Depending on the capacity of the input port, additional virtual lanes or other packets may be supplied to the same input port. The additional virtual lanes may come from the same segmentation module or from a different segmentation module.

The ingress converter may be reconfigured dynamically in some embodiments. The number of virtual lanes, the word size, or both may change. When the number of virtual lanes changes, the number of segmentation modules utilized changes correspondingly. The ingress converter may change configuration at frame boundaries in the ODUk signal. When the framed input signal is an ODUflex signal, the configuration changes may correspond to rate changes in the ODUflex signal. When the rate increases the number of virtual lanes may increase, and when the rate decreases the number of virtual lanes may decrease.

Figure 2B:
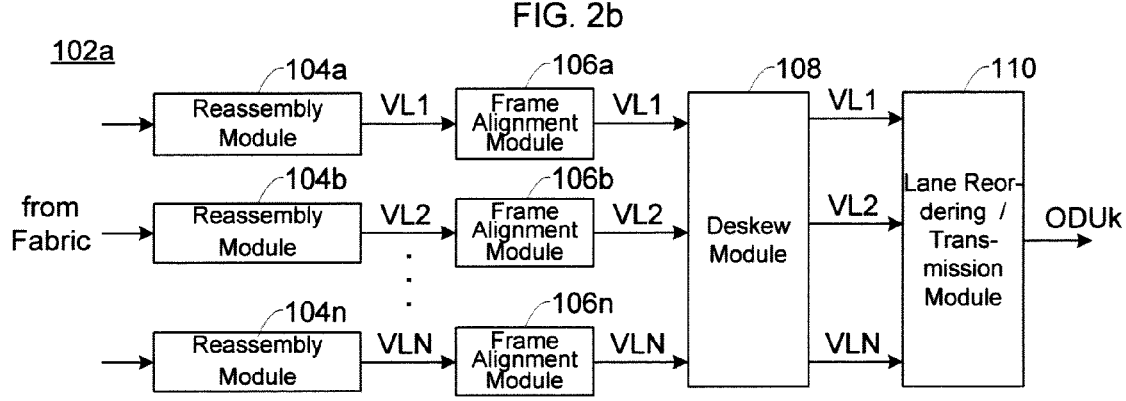
FIG. 2B is a block diagram of an egress converter in accordance with aspects of the invention.

FIG. 2B is a block diagram of an egress converter in accordance with aspects of the invention. In some embodiments, the egress converter may be used as one of the egress converters 102a-n of the networking device of FIG. 1. The egress converter, in some embodiments, is built of electronic circuitry. For example, an egress converter may be an integrated circuit or part of integrated circuit along with other circuitry including, for example, ingress converters or other egress converters. In other embodiments, the egress converter may be implemented using programmed instructions on a processor.

The egress converter receives packets at a plurality of reassembly modules 104a-n. The packets received by all the reassembly modules within one egress converter are associated with the same OTN signal. Each reassembly module receives packets associated with one virtual lane. In some embodiments, the packets output from a switch fabric are supplied to a specific reassembly module based on the identification of the lane where the packet was created. In these embodiments, some operations of the egress converter may be simplified as described below. The reassembly module assembles the data from the received packets to create a virtual lane by removing the overhead from the packet and concatenating the payload data from the packets. Since the packets for each virtual lane are sent through the switch fabric using a single input-output port pair, the packets arrive at the reassembly module in their original order. The reassembly module thus concatenates the payload data from the packets in the order received.

The virtual lanes from the reassembly modules are supplied to frame alignment modules 106*a-n*. Each frame alignment module finds where frames begin in the virtual lane that it receives. The virtual lanes and indicators of frame beginnings in each virtual lane are passed to a deskew module 108.

The deskew module time aligns the virtual lanes to compensate for differing delays in streams of packets arriving at the egress converter. Virtual lanes that arrive relatively early are delayed to be time-aligned with the latest arriving virtual lane. Since the striping used to form the virtual lanes rotates the FAS between the virtual lanes for each frame, a frame beginning signaled by the FAS occurs in each virtual lane only every N-th (N equaling the number of virtual lanes) frame. When the virtual lanes are time aligned the FAS signals from the virtual lanes occur at regular intervals—the frame length divided by N. The MFAS is used to establish the correct time alignment of FAS signals between the virtual lanes. The deskew module delays the virtual lanes to put the MFAS values in sequence and to space the FAS signals at uniform intervals. The time-aligned virtual lanes are supplied to a lane reordering and transmission module 110.

The lane reordering and transmission module reorders the virtual lanes to match the order of striping used in forming the virtual lanes. The virtual lanes may be ordered, for example, based on the MFAS values. In embodiments where the virtual lanes are marked using a byte of the FAS as described above for the striping module of FIG. 2A, the reordering may used this lane marker byte to order the lanes. The value of the lane marker byte is then restored to its FAS value. In embodiments where packets are supplied to a specific reassembly module and thus end up in a specific virtual lane based on the identification of the virtual lane where the packet was created, the reordering may be omitted as the virtual lanes are fully identified before being received by the lane reordering and transmission module. Data from the ordered virtual lanes are transmitted in round-robin fashion. M bytes from the first virtual lane VL1 are transmitted, then M bytes from the second virtual lane VL2 are transmitted, and so on through the N-th virtual lane VLN, and repeating beginning again with the first virtual lane. In embodiments with padding of frames, as described above for the striping module of FIG. 2A, the data from the padded locations are not transmitted.

In embodiments used with an ingress converter that is reconfigured dynamically, the egress converter is also reconfigured dynamically. For example, the number of reassembly modules and the number of frame alignment modules utilized may change when the number of virtual lanes changes. The egress converter reconfigures at the frame boundaries that the corresponding ingress converter reconfigures. Thus, data received by the ingress converter may be transmitted from the egress converter without interruptions in the data. In some embodiments, control packets are sent between paired ingress and egress converters to coordinate reconfiguration of the converters. The control packets are included in an overhead part of the framed signals in some embodiments. In other embodiments, control packets are sent using the packets transmitted from the ingress converter and received by the egress converter. The packets may signal a reconfiguration to be performed at a future time and, in some embodiments, an acknowledgement signal may be communicated before the reconfiguration is performed. In other embodiments, a separate communication channel, for example, an operations, administration, maintenance, and provisioning channel, may be used to reconfigure ingress and egress converters.

FIG. 3 is a flowchart of a process for switching optical transport network flows using a packet switch fabric in accordance with aspects of the invention. In some embodiments, the process is performed by a networking device, for example, the networking device illustrated in FIG. 1. The process may be performed by circuitry with specific functions, circuitry performing program instructions, or a combination thereof. In block 301, the process receives a plurality of OTN input signals. The process receives each OTN input signal on an input port. In one embodiment, the OTN input signals are ODUk signals.

In block 303, the process converts the OTN input signals into packets. The process may perform the conversion into packets for OTN input signal independently of the conversion for the other OTN input signals. The process may use an ingress converter as illustrated in FIG. 2A to perform the conversion into packets for each of the OTN input signals. The process stripes or inverse multiplexes the OTN input signal into virtual lanes and then segments each virtual lane into a sequence of packets, for example, Ethernet packets.

In block 305, the process receives the packets produced in block 303 on a plurality of packet input ports and switches the packets to a plurality of packet output ports. All of the packets from one of the virtual lanes are received on the same input port and switched to the same output port. The process may receive packets from different virtual lanes including virtual lanes originating from different OTN input signals on the same packet input port. Likewise, the process may switch packets from different virtual lanes including virtual lanes originating from different OTN input signals to the same packet output port.

In block 307, the process converts the switched packets to OTN output signals. The process may perform the conversion into OTN output signals independently of the conversion for the other OTN output signals. The process may use an egress converter as illustrated in FIG. 2B to perform the conversion from packets for each of the OTN output signals. The process assembles the packets from each virtual lane by concatenating the payload data from the packets. The relative timing of the reassembled virtual lanes is determined and the virtual lanes are combined to produce an OTN output signal.

In block 309, the OTN output signals are transmitted. The process transmits each OTN output signal on an output port. The format of each OTN output signal generally matches that of the OTN input signal switched to that OTN output signal. In other words, an OTN output signal generally has the same format as an associated OTN input signal. Thereafter the process returns.

Figure 4:
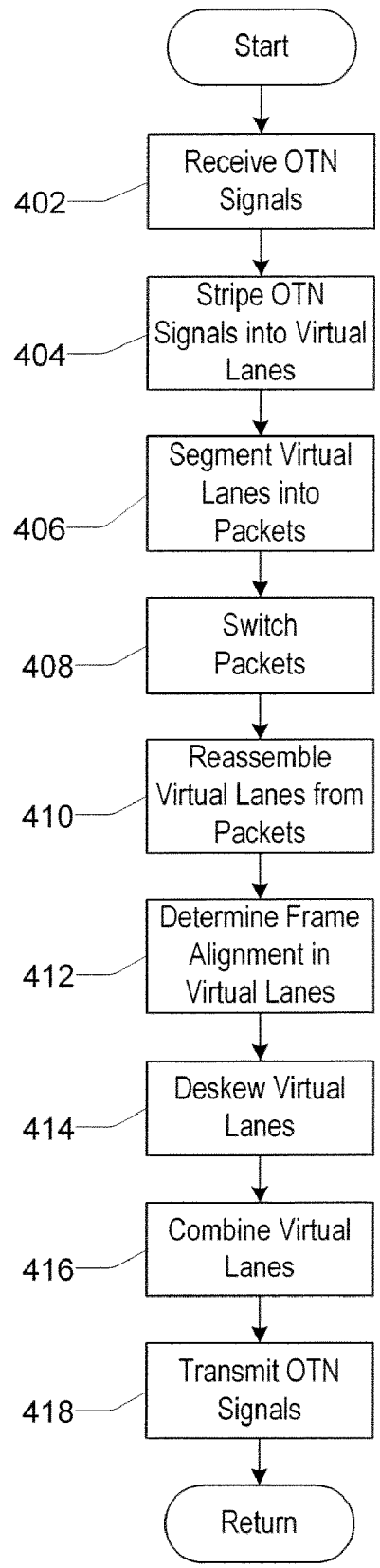
FIG. 4 is a flowchart of a further process for switching optical transport network flows using a packet switch fabric in accordance with aspects of the invention.

FIG. 4 is a flowchart of a further process for switching optical transport network flows using a packet switch fabric in accordance with aspects of the invention. In some embodiments, the process is performed by a networking device, for example, the networking device illustrated in FIG. 1. The process may be performed by circuitry with specific functions, circuitry performing program instructions, or a combination thereof. In block 402, the process receives a plurality of OTN input signals. The process receives each OTN input signal on an input port. In one embodiment, the OTN input signals are ODUk signals.

In block 404, the process stripes the OTN input signals into virtual lanes. Each virtual lane is formed by placing segments, for example, sixteen bytes, of the input signals signal into each of the virtual lanes in round-robin fashion. The process may use a striping module as illustrated in FIG. 2A to perform block 404 for each of the OTN input signals. In block 406, the process segments the virtual lanes from block 404 into a sequence of packets. The packets may be, for example, Ethernet packets. The process may use a segmentation module as illustrated in FIG. 2A to perform block 406 for each of the virtual lanes.

In block 408, the process receives the packets produced in block 406 on a plurality of packet input ports and switches the packets to a plurality of packet output ports. All of the packets from one of the virtual lanes are received on the same input port and switched to the same output port. The process may receive packets from different virtual lanes including virtual lanes originating from different OTN input signals on the same packet input port. Likewise, process may switch packets from different virtual lanes including virtual lanes originating from different OTN input signals to the same packet output port.

In block 410, the process reassembles the switched packets into virtual lanes. The reassembled virtual lanes may be formed by concatenating the payload data from the packets. In block 412, the process determines the frame alignment of the virtual lanes. The process detects FAS signals in the virtual lanes to signal the beginning of frames. In block 414, the process deskews the virtual lines to compensate for differences in delays in the arrival of the virtual lanes and produce time-aligned virtual lanes. The process may use MFAS signals to determine the correct time-alignment. In block 416, the process combines the virtual lanes to produce an OTN output signal. The virtual lanes are combined in round-robin fashion. In some embodiments, prior to being combined, the virtual lanes are ordered to match the ordering of the striping performed in block 404, for example, using MFAS signals. The process may perform block 410, block 412, block 414, and block 416 independently for each OTN output signal.

In block 418, the OTN output signals are transmitted. The process transmits each OTN output signal on an output port. The format of each OTN output signal generally matches that of the OTN input signal switched to that OTN output signal. In other words, an OTN output signal generally has the same format as an associated OTN input signal. Thereafter the process returns.

Although the invention has been discussed with respect to various embodiments, it should be understood the invention comprises the novel and unobvious claims, and their insubstantial variations, supported by this disclosure.

The invention claimed is:

1. A networking device for switching framed flows with packet-based switching, comprising:
  a plurality of ingress converters, each of the plurality of ingress converters configured to receive a framed input signal and to convert the framed input signal into packets to be placed in a plurality of virtual lanes;
  a packet switching fabric coupled to the plurality of ingress converters to receive the packets in the plurality of virtual lanes on a plurality of input ports and configured to switch the packets to a plurality of output ports; and
  a plurality of egress converters, each of the plurality of egress converters coupled to the packet switching fabric to receive at least some of the packets from the output ports of the packet switching fabric and configured to supply a framed output signal converted from the received packets, wherein each of the plurality of ingress converters comprises:
    a striping module configured to inverse multiplex the framed input signal into a plurality of virtual lanes; and
    a plurality of segmentation modules, each of the plurality of segmentation modules receiving one of the plurality of virtual lanes and segmenting the data in the received virtual lane into a sequence of packets.

2. The networking device of claim 1, wherein the framed input signals are Optical Data Channel Unit ("ODU") signals and the framed output signals are ODU signals.

3. The networking device of claim 1, wherein the packet switching fabric switches Ethernet packets.

4. The networking device of claim 1, wherein the striping module assigns data from the framed input signal to the virtual lanes based on a frame alignment signal in the framed input signal.

5. The networking device of claim 4, wherein the striping module assigns data from the framed input signal to the virtual lanes additionally based on a multiframe alignment signal in the framed input signal.

6. The networking device of claim 1, wherein the striping module is further configured to add padding information to the framed input signal.

7. The networking device of claim 1, wherein each of the plurality of egress converters comprises:
  a plurality of reassembly modules, each of the plurality of reassembly modules configured to receive packets from the packet switching fabric associated with one of the plurality of virtual lanes and to produce a reassembled virtual lane assembled from the data in the received packets, where the received packets include an identifier of the virtual lane created in a corresponding ingress converter;
  a plurality of frame alignment modules, each of the plurality of frame alignment modules configured to receive the reassembled virtual lane from one of the plurality of reassembly modules and find a frame alignment in reassembled virtual lane;
  a deskew module coupled to the plurality of frame alignment modules and configured to time-align the reassembled virtual lanes; and
  a combing module coupled to the deskew module and configured to combine the reassembled virtual lanes for transmission as a framed output signal.

8. The networking device of claim 1, wherein each of the plurality of egress converters comprises:
  a plurality of reassembly modules, each of the plurality of reassembly modules configured to receive packets from the packet switching fabric associated with one of the plurality of virtual lanes and to produce a reassembled virtual lane assembled from the data in the received packets;
  a plurality of frame alignment modules, each of the plurality of frame alignment modules configured to receive the reassembled virtual lane from one of the plurality of reassembly modules and find a frame alignment in reassembled virtual lane;
  a deskew module coupled to the plurality of frame alignment modules and configured to time-align the reassembled virtual lanes; and
  a lane reordering module coupled to the deskew module and configured to order the reassembled virtual lanes and combine the recorded reassembled virtual lanes for transmission as a framed output signal.

9. The networking device of claim 1, wherein each of the ingress converters is further configured to change the number of virtual lanes in the plurality of virtual lanes while converting the framed input signal.

10. A method of switching framed signals with a packet-based switch, the method comprising:
  receiving a plurality of framed input signals;
  converting each of the plurality of framed input signals to packets logically grouped in virtual lanes;
  switching the packets converted from the plurality of framed input signals from input ports of a packet switch fabric to output ports of the packet switch fabric;
  converting the packets from the output ports of the packet switch fabric to framed output signals; and
  transmitting the framed output signals,
  wherein converting the packets from the output ports of the packet switch fabric to framed output signals comprises:
  reassembling the packets from the output ports of the packet switch fabric associated with one of the virtual lanes to produce a reassembled virtual lane assembled from the data in the received packets;
  determining frame alignment in each of the reassembled virtual lanes;
  deskewing the reassembled virtual lanes using the determined frame alignments; and
  combining the deskewed reassembled virtual lanes to produce the framed output signals.

11. The method of claim 10, wherein converting each of the plurality of framed input signals to packets logically grouped in virtual lanes comprises:
  inverse multiplexing the framed input signal into a plurality of virtual lanes; and
  segmenting each of the plurality of virtual lanes into a sequence of packets.

12. The method of claim 10, further comprising reordering the deskewed reassembled virtual lanes to correspond to an ordering used in converting each of the plurality of framed input signals to packets logically grouped in virtual lanes.

13. The method of claim 10, further comprising changing a number of virtual lanes the packets are logically grouped in while converting one of the plurality of framed input signals to packets logically grouped in virtual lanes.

* * * * *